United States Patent [19]
Zias et al.

[11] Patent Number: 5,734,852
[45] Date of Patent: Mar. 31, 1998

[54] METHOD AND APPARATUS FOR DISPLAYING HARDWARE DEPENDENT GRAPHICS IN AN OBJECT-ORIENTED OPERATING SYSTEM

[75] Inventors: Jeff A. Zias, Santa Clara; Donald M. Marsh, Mountain View, both of Calif.

[73] Assignee: Object Technology Licensing Corp., Cupertino, Calif.

[21] Appl. No.: 608,327

[22] Filed: Mar. 8, 1996

Related U.S. Application Data

[63] Continuation of Ser. No. 161,384, Dec. 2, 1993, abandoned.
[51] Int. Cl.$^6$ .................................................. G06F 3/14
[52] U.S. Cl. ........................... 395/334; 395/326; 395/333
[58] Field of Search ............................ 395/326, 327, 395/328, 329, 330, 331, 332, 333, 334, 335, 500, 800

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,245,702 | 9/1993 | McIntyre et al. | 395/164 |
| 5,283,900 | 2/1994 | Frankel et al. | 395/700 |
| 5,347,632 | 9/1994 | Filepp et al. | 395/200 |
| 5,379,431 | 1/1995 | Lemon et al. | 395/700 |
| 5,392,448 | 2/1995 | Frankel et al. | 395/800 |

FOREIGN PATENT DOCUMENTS

| | | |
|---|---|---|
| A0398644 | 11/1990 | European Pat. Off. . |
| 2248130 | 3/1992 | United Kingdom . |

OTHER PUBLICATIONS

UNIV. of Illinois, May/1991, Urbana, US, Report No. UIUCDCS-R-91-1707, Chapter 5, pp. 27–43 "A Device Management Framework for an Object Oriented Operating System", Choices Device Management, P. Kougiouris.
Apple Computer, Inc. 1985, V.I(9) "The Window Manager", pp. 267–277, V.II(6), The Device Manager, pp. 173–195, Inside Macintosh, vols. I, II, III.
"Apple Computer, Inc. 1986, Cupertino, US Inside MacIntosh vol. 5", C.5, Graphics Devices, pp. 117–131, C.19 The Start Manager, pp. 347–356, C.23 The Device Manager pp. 421–428, C.24 The Slot Manager pp. 435–437.

Primary Examiner—Thomas G. Black
Assistant Examiner—Buay Lian Ho
Attorney, Agent, or Firm—Bookstein & Kudirka

[57] ABSTRACT

Screen objects used by the application programs to draw or paint on the display screen are created in accordance with a predefined class structure which represents a generic display system. Developers of specialized hardware develop specialized classes based on the predefined structure to handle specific command sets and protocols. When the system is initially powered up or reconfigured, the screen objects are created from the generic and specialized classes as necessary by examining the actual display hardware present in the system. When the specialized classes are used to create the screen objects, the screen objects receive the specialized command sets and protocols necessary to interact with display hardware which have been provided by the hardware developers.

53 Claims, 10 Drawing Sheets

METHOD AND APPARATUS FOR DISPLAYING HARDWARE DEPENDENT GRAPHICS IN AN OBJECT-ORIENTED OPERATING SYSTEM

This is a continuation, of application Ser. No. 08/161,384 filed on Dec. 2, 1993 and now abandoned.

COPYRIGHT NOTIFICATION

Portions of this patent application contain materials that are subject to copyright protection. The copyright owner has no objection to the facsimile reproduction by anyone of the patent document, or the patent disclosure, as appears in the Patent and Trademark Office. All other rights are expressly reserved.

1. Field of the Invention

This invention relates generally to improvements in computer systems and, more particularly, to operating system software for managing hardware dependent graphics in a windows-oriented graphical user interface.

2. Background of the Invention

One of the most important aspects of a modern computing system is the interface between the human user and the machine. The earliest and most popular type of interface was text based; a user communicated with the machine by typing text characters on a keyboard and the machine communicated with the user by displaying text characters on a display screen. More recently, graphic user interfaces have become popular in which the machine communicates with the user by displaying graphics, including text and pictures, on a display screen and the user communicates with the machine both by typing in text-based commands and by manipulating the displayed pictures with the pointing device, such as a mouse.

Many modern computer systems operate with a graphic user interface called a "window environment". In a typical window environment, the graphical display portrayed by the display screen is arranged to resemble the surface of an electronic "desktop" and each application program running on the computer is represented as one or more electronic "paper sheets" displayed in rectangular regions of the screen called "windows".

Each rectangular region generally displays information which is generated by the associated application program and there may be several window regions simultaneously present on the desktop with each window region representing information generated by different application programs. An application program presents information to the user through each window by drawing or "painting" images, graphics or text within the window region. The user, in turn, communicates with the application both by "pointing" at objects in the window region with a cursor which is controlled by a pointing device and manipulating or moving the objects and also by typing information into the keyboard. The window regions may also be moved around on the display screen and changed in size and appearance so that the user can arrange the desktop in a convenient manner.

In general, the window environment described above is part of the computer operating system. The operating system also typically includes a collection of utility programs that enable the computer system to perform basic operations, such as, storing and retrieving information on a disk memory, and performing file operations including the creating, naming and renaming of files and, in some cases, performing diagnostic operations in order to discover or recover from malfunctions.

The last part of the computing system is the "application program" which interacts with the operating system to provide much higher level functionality, perform a specific task and provide a direct interface with the user. The application program typically makes use of the operating system functions by sending out a series of tasks and commands to the operating system which then performs the required task. For example, the application may request that the operating system store particular information on the computer disk memory or display information on the video display.

In a graphically-oriented environment, such as the windowing environment described above, the display capabilities of the video display device are crucial to the operation of the system. Therefore, it is important that both the application program and the operating system operate efficiently with the display hardware which is present in the system. In particular, due to the large volume of graphic information, the display hardware may have special accelerators or video circuitry built in. The display hardware may also have specialized capabilities including circuitry for performing such video effects as wipes, chroma keying, mosaics, motion video and other effects which would be difficult, if not impossible, to accomplish with software. Consequently, the various commands and protocols required by this specialized hardware must be made available to the application programs and, ultimately, the user.

However, the provision of specific commands and protocols for use with specialized hardware is practically difficult because a given application program must be able to operate on computer systems which are configured in many different ways and may or may not have specialized display hardware. Further, video display hardware that is manufactured by different manufacturers may have completely different protocols. If the capabilities for communicating directly with the specialized hardware are provided directly in the application program, inefficient program development time results.

For example, FIG. 1 is schematic illustration of a typical computer system utilizing both an application program and an operating system. The computer system is schematically illustrated by dotted box 100, the application program is represented by box 102 and the operating system by box 106 and the interaction between the application program 102 and the operating system 106 is illustrated schematically by arrow 104. This division between an application program and an operating system is used in common on many types of computer systems ranging from main frames to personal computers.

The method for handling graphical displays, however, varies from computer to computer, and, in this regard, FIG. 1 is more representative of a prior art personal computer system. In order to provide a graphical display, the application program 102 interacts (as shown schematically by arrow 108) with display driver software 110. In the arrangement shown in FIG. 1, display driver software 110 is a separate program which is provided with application program 102. Display driver software 102 receives display commands from the application program and generates the signals necessary to control the display hardware. As each type of display hardware has its own particular format and control commands, the display driver software 110 generally must be specifically designed to operate with one type of display.

The display driver software 110 generates an information stream containing the display information and associated commands as shown schematically as arrow 114. The display information stream is, in turn, applied to a display adapter 112 which contains circuitry that converts the information stream into electrical signals and the signals are, in turn, sent over a cable 116 to a display 118. The display 118 typically contains circuits which generate a two-dimensional "raster" on the screen and the incoming display information screen is used to modify points or "pixels" on the raster necessary to develop the actual graphical display. The result is a two-dimensional graphical display which is generally in color.

The configuration shown in FIG. 1 has the advantage that the display driver software is provided with the application program and, thus, the application program developer can write display drivers for specific display hardware, utilizing all of the available capabilities. The disadvantage with the FIG. 1 arrangement became apparent as the number of specialized display hardware types and display types proliferated. Since, in general, separate driver software had to be written for each hardware type, the number of display drivers which were required for each application program so that the program was compatible with, and could take advantage of, all of the hardware that was available increased as well. Application program developers had to provide many display drivers with each application program, resulting in wasted time and effort and wasted disk space to hold the many drivers of which only one or two were of interest to any particular user. Unfortunately, if a user purchased an application program and it did not include a display driver which would control the display which the user owned, at best, the application program was unable to exploit available display capabilities. More likely, unpredictable operation occurred and either the program did operate satisfactorily or did not operate at all with the display.

In order to overcome the aforementioned difficulties, the prior art arrangement was modified as shown in FIG. 2. In this new arrangement, computer system 200 is still controlled by application program 202 which cooperates, as shown schematically by arrow 204, with operating system 206. However, in the system shown in FIG. 2 operating system 206 includes a "view system" 208 which manages the graphical interaction with the application program 202. Operating system 206 also includes the display drivers 214. In order to use specialized hardware capabilities, a separate display driver still must be provided for each different type of display hardware, but the display drivers 214 are now sold with, and part of, the operating system 206. Consequently, it is not necessary for each application program to have its own set of display drivers.

More particularly, an application program, such as application program 202 communicates with the display driver 214 by means of a standardized interface 208 which is called a "view system". In this type of system, application program 202 displays information on the display 222 by writing into a screen buffer which is part of the view system 208. The view system 208, in turn, forwards display information, as shown by arrow 212, to display driver 214 which, as previously described, converts the information into the format required by the particular display device. The output of the display driver 214 as provided (illustratively shown by arrow 216) to display adapter 218 where it is converted into electrical signals that are transmitted, via cable 220, to the display 222.

The configuration shown in FIG. 2 has the advantage that the application program developer need not worry about the specific computer and display combinations on which the program is to ultimately run. However, in order to provide advanced display capabilities to the application program, the operating system now must include specific drivers for each display hardware type and must somehow transmit the specialized commands and protocols required by these drivers back through the view system to the application program. Therefore, the view system must either contain command sets for specialized hardware, most of which will not be used by more than a small fraction of the operating system users, or must be able to transmit the command sets from the drivers to the application program. Furthermore, as new types of display hardware are being continually developed, the operating system will be continually "out-of-date" and will not be able to provide capabilities for newly-developed hardware without providing new display drivers in subsequent "versions".

Accordingly, it is an object of the present invention to provide an object-oriented operating system which can dynamically determine and utilize the hardware capabilities of the display devices attached to the computer system.

It is another object of the present invention to dynamically generate display objects that incorporate specialized hardware capabilities and which can be manipulated under control of application program to control the specialized hardware.

SUMMARY OF THE INVENTION

The foregoing problems are overcome and the foregoing objects are achieved in one illustrative embodiment of the invention in which screen objects used by the application programs to draw or paint on the display screen are created in accordance with a predefined class structure which represents a generic display system. Developers of specialized hardware develop specialized classes based on the predefined structure to handle specific command sets and protocols.

When the system is initially powered up or reconfigured, the screen objects are created from the generic and specialized classes as necessary by examining the actual display hardware present in the system. When the specialized classes are used to create the screen objects, the screen objects receive the specialized command sets and protocols necessary to interact with display hardware which have been provided by the hardware developers.

More particularly, specialized display driver capabilities are constructed dynamically by creating screen objects from a generic and specialized class mix that is selected using specifications obtained from information pertaining to the specific display device.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENT OF THE INVENTION

Figure 1:
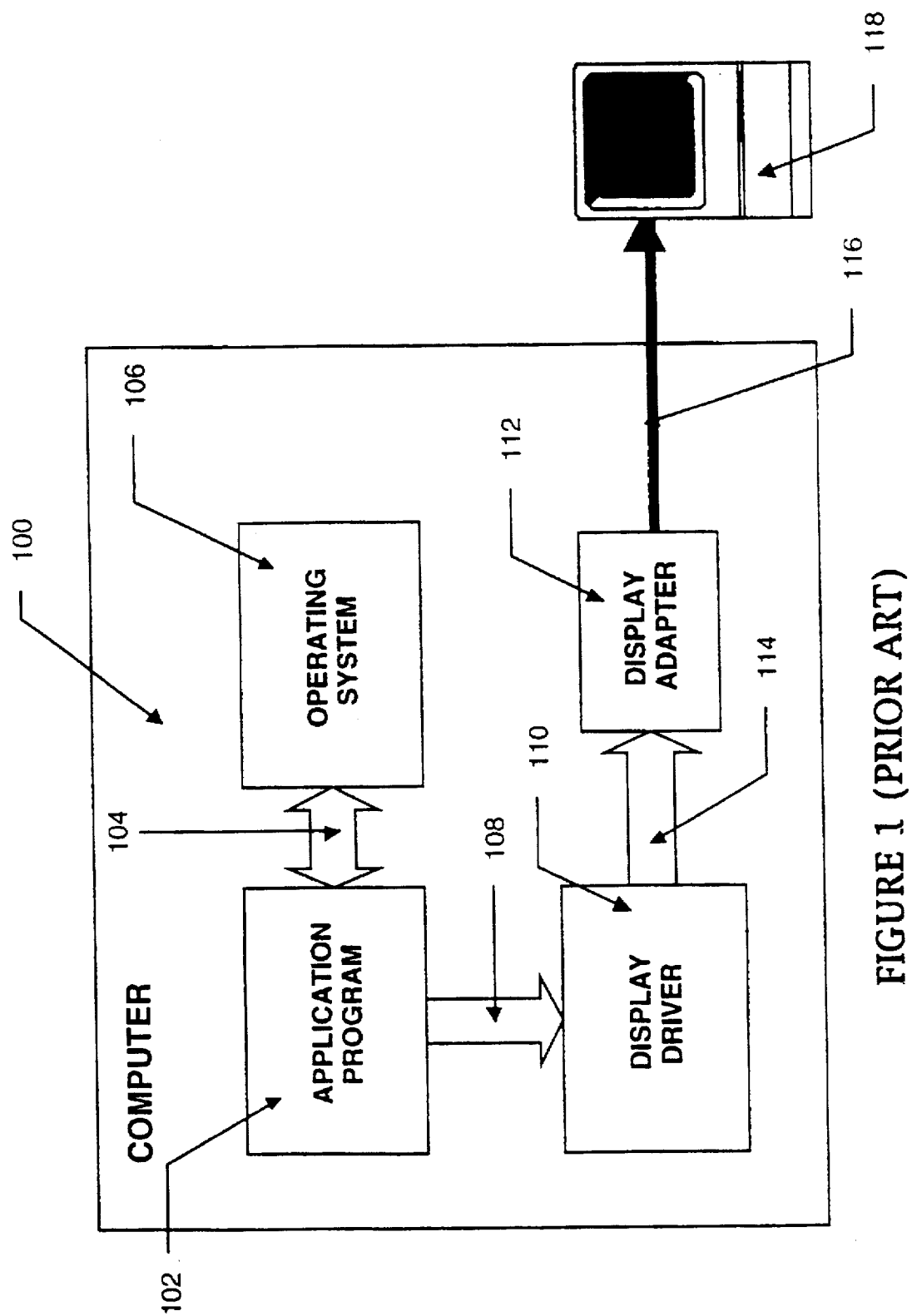
FIG. 1 is a schematic block diagram of a prior art computer system showing the relationship of the application program to the operating system and the display drivers.
Figure 2:
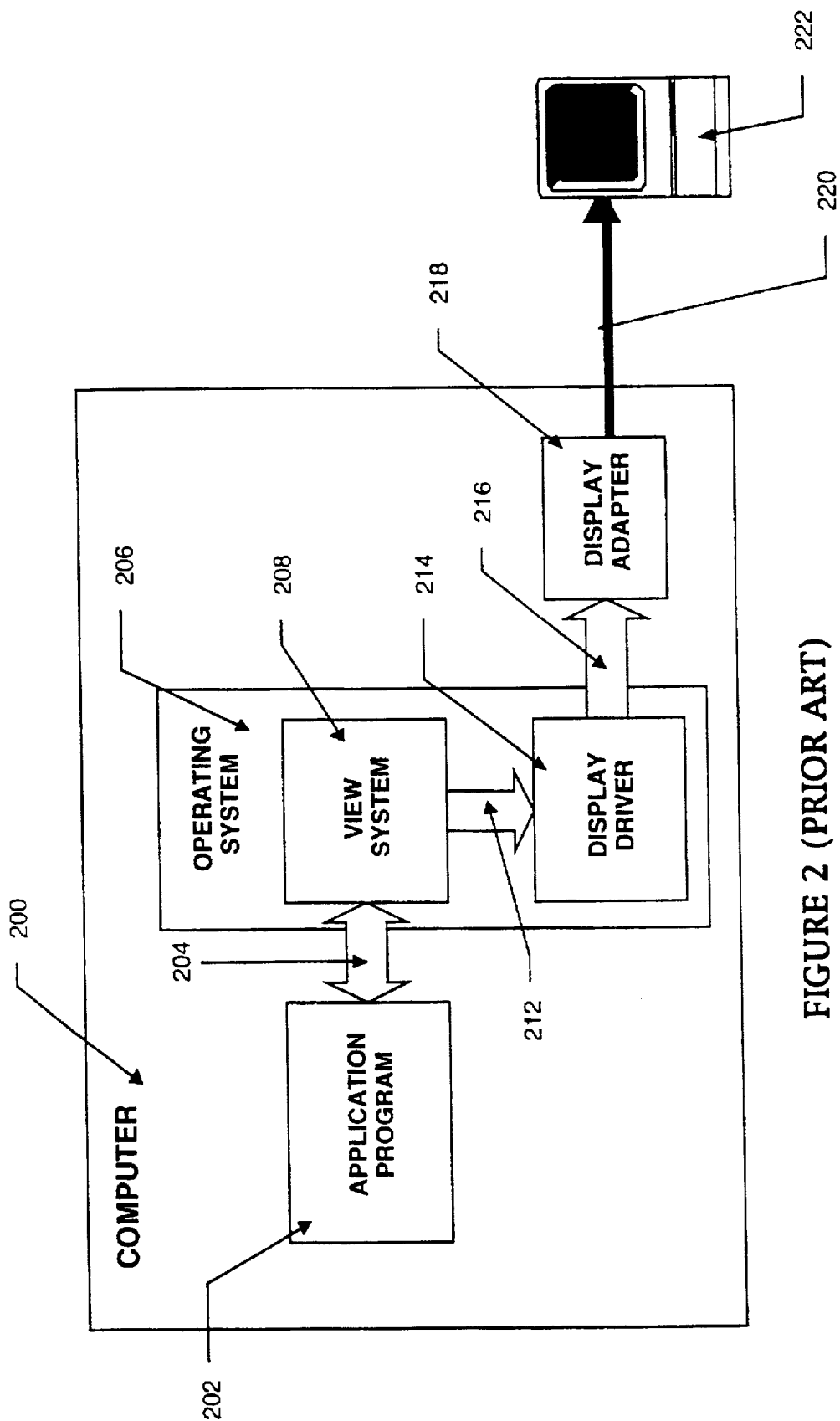
FIG. 2 is a schematic block diagram of a modification of the prior art system shown in FIG. 1 to allow the application program to interface with a standard graphical interface.
Figure 3:
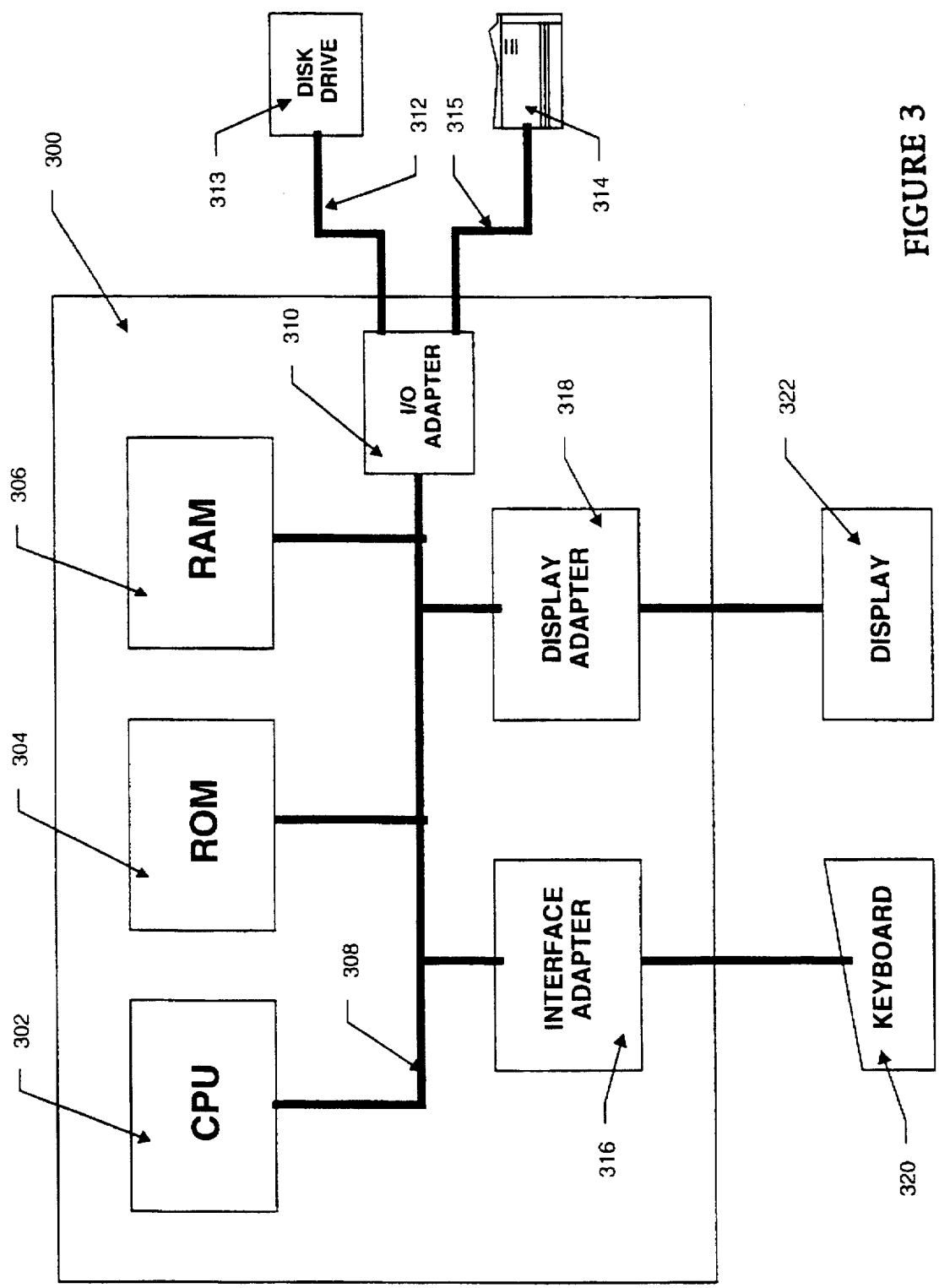
FIG. 3 is a block schematic diagram of a computer system, for example, a personal computer system on which the inventive object oriented operating system operates.

The invention is preferably practiced in the context of an operating system resident on a personal computer such as the IBM, PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302 (which may be a conventional microprocessor) and a number of other units, all interconnected via a system bus 308, are provided to accomplish specific tasks. Although a particular computer may only have some of the units illustrated in FIG. 3, or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. A user interface adapter 316 is also provided for connecting input devices, such as a keyboard 320, and other known interface devices including mice, speakers and microphones to the bus 308. Visual output is provided by a display adapter 318 which connects the bus 308 to a display device 322, such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvement over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NEXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a display framework which could provide the foundation for creating, deleting and manipulating windows to display information generated by an application program. An application software developer who needed these capabilities would ordinarily have to write specific routines to provide them. To do this with a framework, the developer only needs to supply the characteristics and behavior of the finished display, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 4:
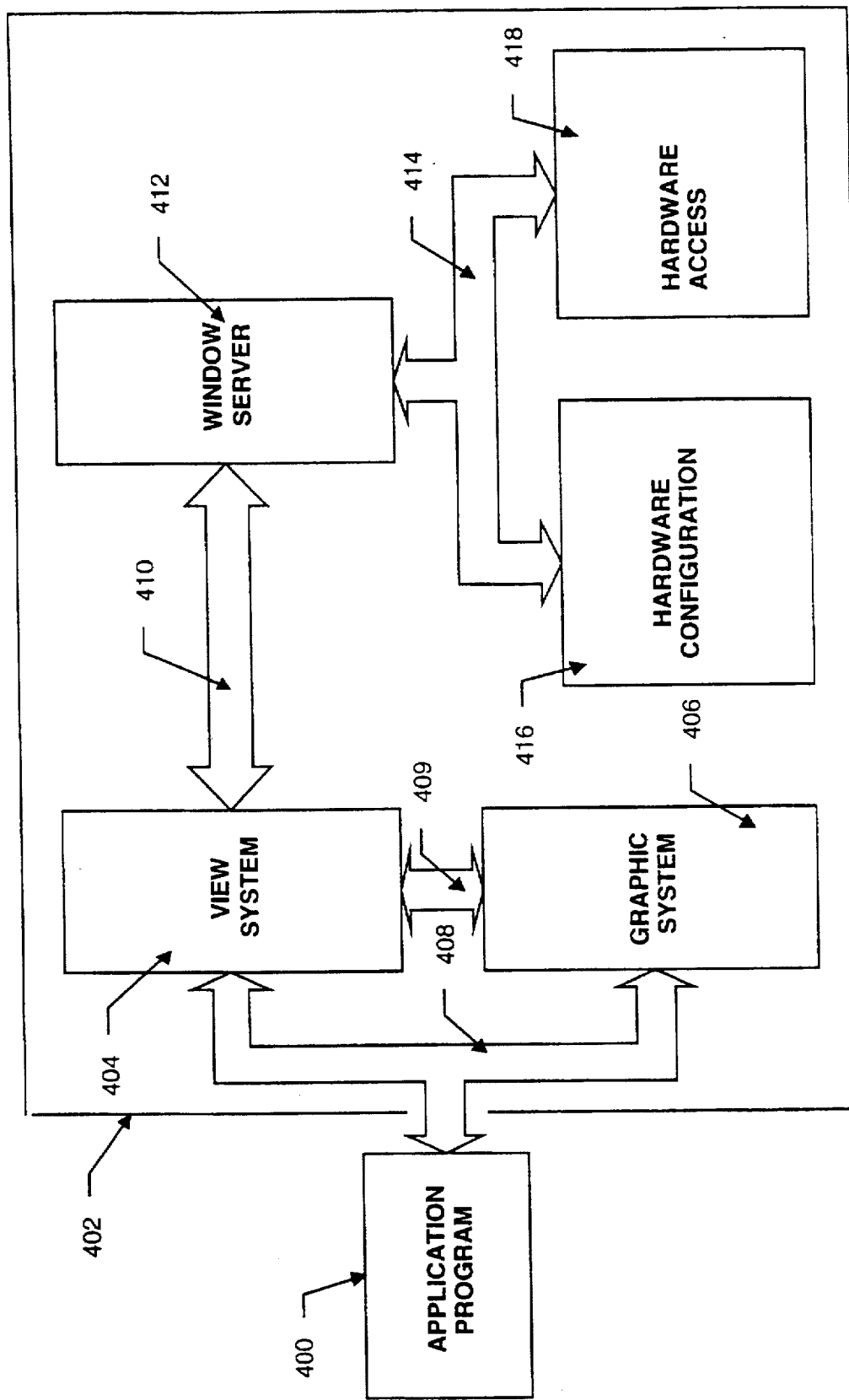
FIG. 4 is a simplified schematic block diagram of an application program and the gain components of a windows-oriented operating system constructed in accordance with the principles of the present invention.

FIG. 4 shows a schematic overview of an application program and a portion of an operating system program which is specialized for a windows-oriented environment. The operating system is shown as dotted box 402 and generally consists of a view system 404, a graphic system 406, a window server 412, a hardware configuration system 416 and a hardware access system 418. In an object-oriented operating system, each of the systems represented by boxes 404-418 may, for example, be a separate object or a collection of objects. There may be several application programs running simultaneously in the system of which only program 400 is shown for clarity.

In order to display information, application program 400 interfaces (as illustrated schematically by arrow 408) with view system 404 and graphic system 406 generally by creating and interfacing with various objects as will hereinafter be described in detail. View system 404 manages the window areas associated with application 400 and contains objects that are capable of creating, destroying and repainting windows. The view system also maintains screen buffer objects which are controlled by application program 400 to actually write or paint on the display devices in the system.

View system 400 includes a subsystem, 406, called a graphic system with which it communicates shown schematically by arrow 409. The graphic subsystem contains objects which in turn facilitate the drawing of graphical images such as lines, circles, squares, etc. on the display screen.

In a windows-oriented environment, view system 404 communicates with another main component called a window server 412, which communication is shown schematically by arrow 410. The main function of window server 412 is to divide the available screen area among all of the running application programs; the window server acts essentially as a system level window manager. More specifically, view system 404 creates windows that have certain extents or bounds, and, based on the ordering of the windows, and the extent of the window overlaps, window server 412 can determine the visible area of each window. This visible area is communicated back to each application program, such as application program 400 and all application programs are expected to restrict drawing to their respective visible areas.

Window server 412 performs some additional "system-level" functions. For example, in order to support special user interface features such as "floating" windows, window server 412 maintains an ordering of window layers, and ensures that all windows are presented on the display in the appropriate order. Window server 412 also maintains an update area for each window which describes the part of the window that has been "damaged" due to window manipulations and window server 412 also notifies the view system 404 when one of the window update areas becomes non-empty. Window server 412 also maintains information about the actual display devices-that make up the desktop. In order to do this, window server 412 interacts, as shown schematically by arrow 414, with two systems that are directly associated with the video display hardware. These devices include a hardware configuration system 416 and a hardware access system 418. As will hereinafter be described in detail, hardware access system 418 obtains specific hardware device characteristics and parameters by querying a small configuration memory that is included on each hardware device. The information gleaned from the configuration memories is passed from the hardware access system 418 to the window server 412 via the creation of specialized device driver objects and display device objects which are specific to a particular type of hardware. These specialized objects are then used to eventually create the screen buffer objects that are used by the view system to draw on the display devices. Commands and methods which are specific to specialized hardware are passed to the screen buffer objects and are then available in the view system for use by the application program.

The specialized device driver and display objects are also provided to the hardware configuration system 416 which contains configuration programs than can query and modify the display driver information to allow a user to change hardware specific information such as bit depth, monitoring, positioning and other hardware specific attributes of the displays.

Figure 5:
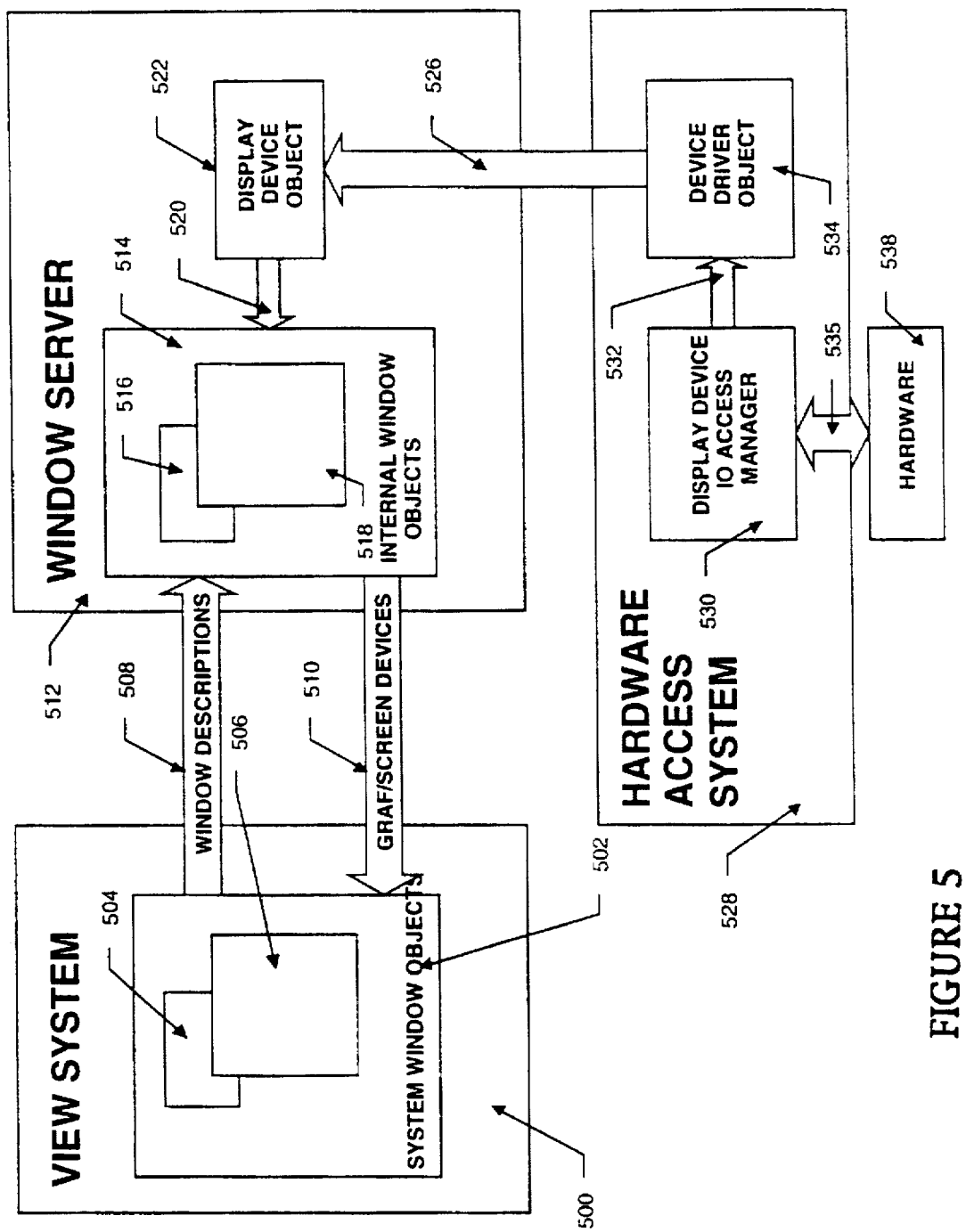
FIG. 5 is a block schematic diagram illustrating in more detail the main components of a windows-oriented operating system including the view system, the window server and, the hardware access system.

FIG. 5 is a more detailed schematic block diagram of the view system, the window server and the hardware access system and illustrates the interactions which are used to make specialized hardware capabilities available to an application program. As previously mentioned, view system 500 is used to create and manipulate windows on the screen area assigned to each application. For example, view system 500 manages "damage" within a document caused by view manipulation or invalidation and creates and destroys windows. The view system creates and destroys windows by creating an destroying corresponding window objects called "system window objects". More particularly, instantiating or creating a system window object from a pre-defined window class creates a corresponding window. Correspondingly, deleting a window object destroys the corresponding window.

The actual process involved in creating a window proceeds as follows: view system 500 creates a system window object using various parameters passed to it from the application program. These parameters may, for example, include the size or extent of the window, the front-to-back location of the window in relation to other windows, a task associated with the window that receives events, whether the window should be initially visible, and the kind of window.

View system 500 may create a plurality of windows for each application and the system window objects created for a particular application are illustrated in dotted box 502 with each system window object schematically represented by its corresponding extent shown as extents 504 and 506. The system window objects 502 are stored in the view system's allocated storage area. The window parameters used in creating each window object are sent to the window server 512 by means of a conventional data stream schematically illustrated as arrow 508. The operation and construction of such a data stream is well-known and will not be discussed in detail herein.

In response to the incoming window parameters, window server 512 actually creates the window area and returns the visible area of the newly-created window to the view system by means of a data stream (not shown). In order to create a window and to manipulate previously-created windows, window server 512 internally represents each window screen area as an "internal" window object. This internal window object is created, in part, using the window parameters sent from the view system 500. The internal windows corresponding to system windows 502 in the view system are illustrated by window objects 514 and these window objects are schematically represented by their internal window "extents" shown as extents 516 and 518 which correspond to window objects 504 and 506, respectively. The internal window objects are stored in the storage area of the window server 512. The internal window objects actually perform manipulations on the windows in response to requests from the view system.

As will hereinafter be described in detail, the internal window objects 514 are created from pre-defined classes which, in general, correspond to generic display systems. In accordance with the present invention, windows which are to incorporate specialized hardware capabilities of display devices can be implemented by creating subclasses of the classes used to create the internal window objects. The correct subclasses which correspond with specialized hardware are then selected at system "power up" or during a reconfiguration by identifying the actual hardware devices and selecting the appropriate subclasses.

More particularly, for each display device that makes up the desktop, there exists a display device object contained in window server 512. For example, one of the display device objects in window server 512 is illustrated by box 522. As illustrated schematically by arrow 520, display device object 522 is used to create the internal window objects for windows which appear on the corresponding display device. By means of IO Access Manager 530, display device object 522 is created with, and knowledgeable of, any specialized hardware capabilities of the underlying hardware. Consequently, display device object 522 can then transfer these specialized hardware capabilities to the internal window objects 516 and 518 at the time that these window objects are created.

More particularly, for each video display device, display device IO Access Manager 530 (found in the hardware access system 528), creates a device driver object 534 as illustrated schematically by arrow 532. The device driver object 534 is specific to the type of hardware to which the display device IO Access Manager 530 is assigned, and, in order to create the device driver object 534, display device IO Access Manager 530 interacts directly with a particular piece of hardware 538. This interaction is shown schematically by arrow 535. Consequently, device driver object 534 can incorporate any specialized hardware capabilities of the underlying hardware device. Subsequently, device driver object 534 is used to create the display device object 522 as illustrated schematically by arrow 526.

In the process of creating internal window objects, such as internal window objects 516 and 518, display device object 522 also creates objects called graph device objects and screen device objects. These objects are used by view system 500 and application program 400 to draw graphics on the display device, and perform non-window operations such as sprite and cursor control. The graph device objects and screen device objects are streamed back to the view system 500 as shown schematically by arrow 510. Arrow 510 represents a conventional data stream which may be the same data stream, or a different data stream than data stream 508.

By the creation chain as described above, the graph device objects and screen device objects created by the internal window objects also incorporate any specialized hardware capabilities in hardware 538.

Figure 6:
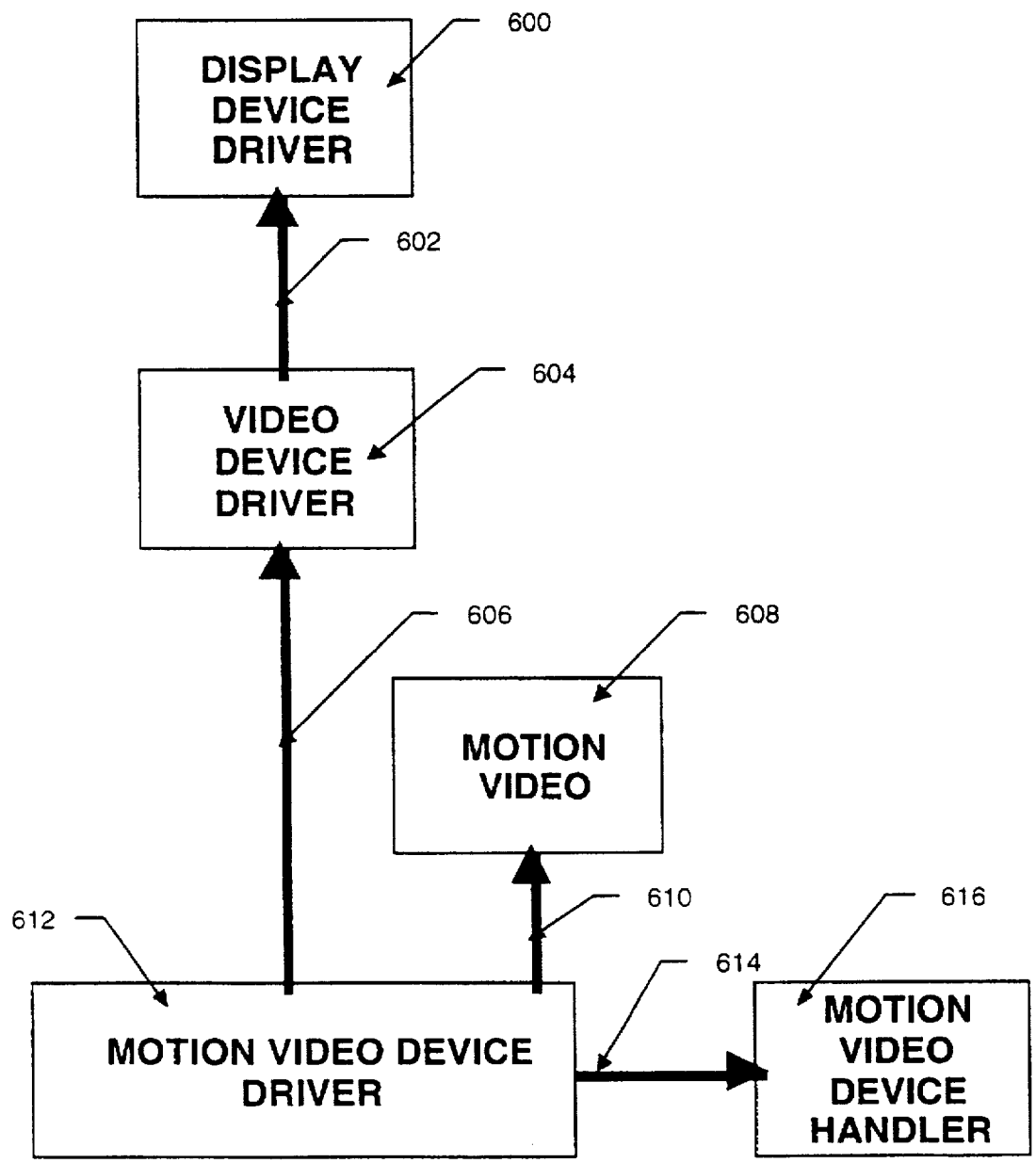
FIG. 6 is a simplified class hierarchy diagram illustrating the base class, subclasses and associated classes involved in the construction of a specialized device driver capable of displaying motion video.

FIG. 6 shows a simplified class hierarchy diagram for classes and subclasses used to create an illustrative specialized display device driver object for hardware that has specialized video capabilities, such as motion video capabilities. In particular, the class (illustrated by box 612) used to construct the motion video device driver object is a subclass of two base classes, including a video device driver class 604 and a motion video class 608. This subclass relationship is represented by arrows 606 and 610, respectively. Therefore, when a motion video device driver object is created by the hardware access system (by invoking its constructor), the constructors of the underlying base objects will also be called in order to construct, and, optionally initialize, the base objects and include the functions and data present in the base objects.

The video device driver class 604 is, in turn, a subclass of a more generic device driver object 600. Display device capabilities which are available to the application program are determined by the class or subclass selected during the creation of the device driver object. For generic displays, class 604 is selected, whereas class 612 is selected when specific hardware capabilities are needed. As will hereinafter be described, the creation of a specialized video device driver object by subclassing class 604 to generate the motion video device driver 612 is accomplished by the display device IO Access Manager which identifies the actual hardware installed on the system and can therefore identify any hardware capabilities which are present. More particularly, any special capabilities of hardware 538 can be incorporated into a video device driver object created from class 604 by appropriately subclassing a generic video device driver class. This subclassing is done by the hardware device developer. The objects created from the classes are constructed dynamically by obtaining parameters from the hardware 538 and using those parameters to construct the appropriate object incorporating the necessary hardware capabilities.

A motion video device driver object created from class 612 also creates a motion video device handle 616 as illustrated schematically by arrow 614. The motion video device handle 616 is used by the window server to manipulate the motion video device driver.

Figure 7:
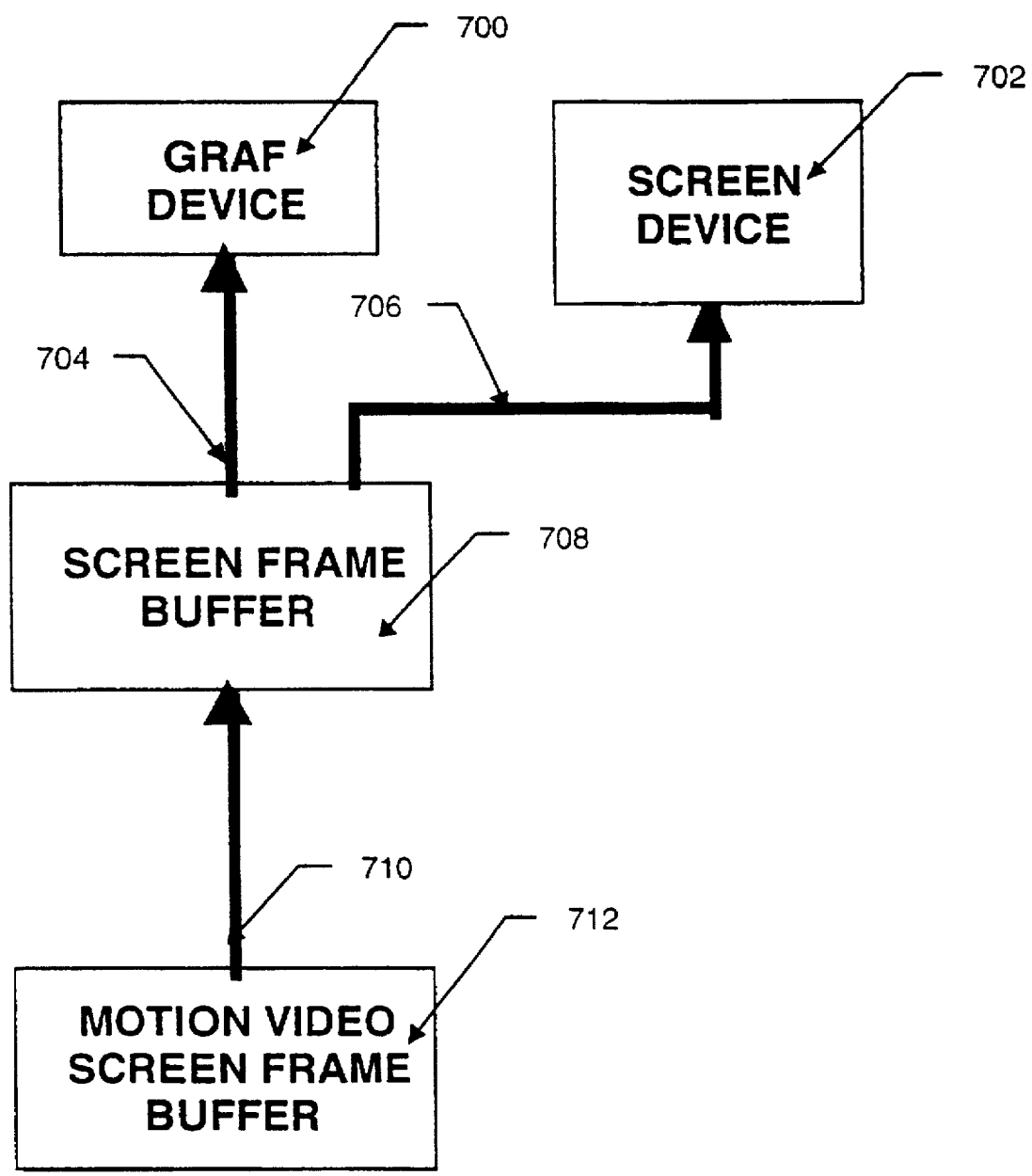
FIG. 7 is a simplified class hierarchy diagram illustrating the base class, subclasses, and associated classes involved in the construction of a specialized screen frame buffer object which is capable of displaying motion video.

FIG. 7 shows a simplified class hierarchy diagram illustrating the classes and subclasses used in the creation of a specialized screen frame buffer object for use by the view system and application programs. FIG. 7 illustratively shows classes for the creation of a motion video screen frame buffer object corresponding to the motion video device driver object constructed from the classes illustrated in FIG. 6.

The motion video screen frame buffer class 712 is a subclass of a more generic screen frame buffer class 708 as shown by arrow 710. The screen frame buffer class 708 is, in turn, a subclass of both a graph device class 700, which contains an interface to render graphic primitives, and a screen device class 702, which contains an interface to control non-window objects such as sprites and cursors, as illustrated by arrow 704 and 706. As previously mentioned, both the graph device class 700 and the screen device class 702 are effectively created by a motion video device driver object existing in the window server.

Figure 8:
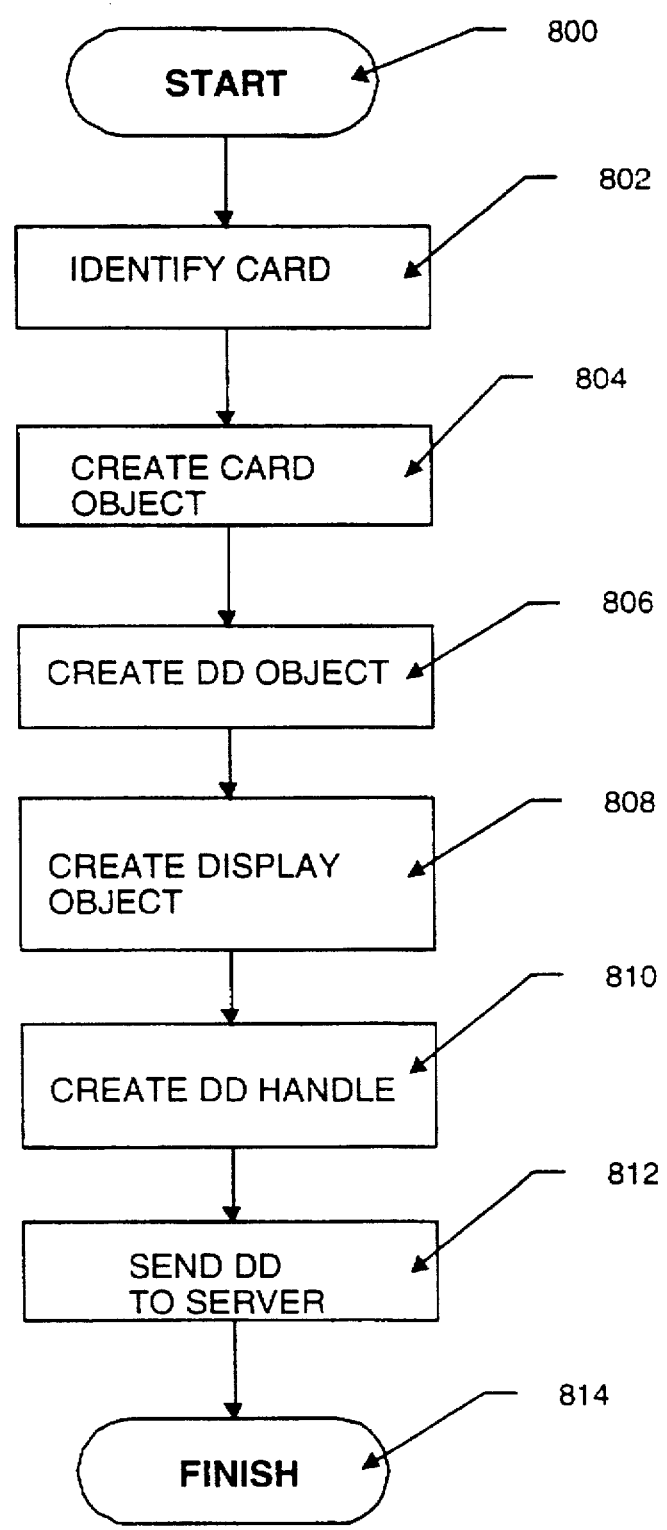
FIG. 8 is an illustrative flow chart of a method by which a specialized display driver object for a video hardware card is created.

FIG. 8 is an illustrative flow chart of the operations performed by the hardware access system (528, FIG. 5) and the window server 512 in creating new device driver objects. The illustrative method starts in step 800 and proceeds to step 802 in which video hardware cards on the display or I/O bus are identified. This identification would normally be done by utilizing a software-driven identification process that starts during start up or boot of the computer system. Alternatively, this identification process may run during a hardware reconfiguration. This latter process checks each of the addresses associated with a particular I/O bus to locate video devices and other cards.

Figure 9:
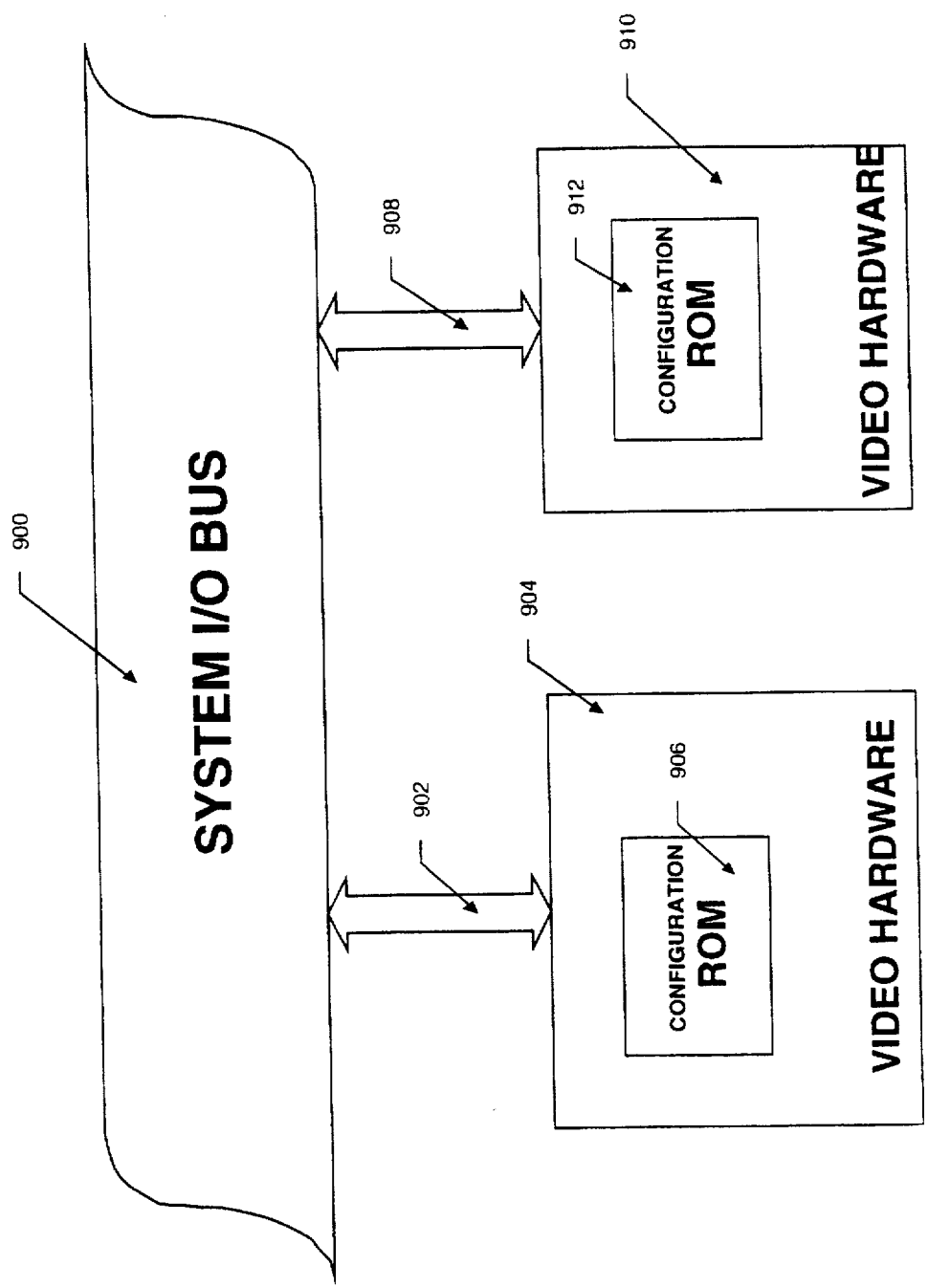
FIG. 9 is a schematic illustration of two video hardware devices both of which are connected to a system input/output bus illustrating the retrieval of configuration parameters from onboard ROM memories.

The routine illustrated in FIG. 8 then proceeds to step 804 where a card "object" is created for each hardware card located on the bus. This creation is performed by instantiating a predefined card object using specific configuration information from each card. The actual configuration parameters of a specific card are obtained in one of several ways. One way is to read a small configuration ROM located on the hardware card. Such an arrangement is shown in FIG. 9 in which two video hardware cards 904 and 910 are connected to the system I/O bus 900 as indicated schematically by arrows 902 and 908. Each of the video hardware cards 904 and 910 contains a small configuration ROM, such as ROMs 906 and 912, respectively. Information is stored in each configuration ROM in several mandatory information fields which include at least a format header block and a board resource list.

Alternatively, the configuration ROM may contain a card identifier code. This code can be used to access prestored device characteristic libraries containing particular card characteristics. The retrieved card characteristics can then be used to create the card object. If a video card is present on the system IO bus that does not have a configuration ROM, then a standard set of parameters can be substituted for the information which would normally be contained in the configuration ROM. In any case, the created card object contains specific parameters that indicate the capabilities of the particular video hardware card.

The routine continues in step 806 in which each video card object creates a device driver object. Referring to FIG. 5, the creation of the device driver object is illustrated schematically by arrow 532. The device driver object uses the specific hardware parameters from the card object to select an appropriate subclass for instantiation. As this subclass has been previously created by the hardware card developer, it includes the functionality necessary to exploit the particular board characteristics.

In step 808, the device driver object creates a display device object, an operation indicated schematically by arrow 526 in FIG. 5. As with the device driver object, the appropriate subclass for the display device object is selected based on the specific hardware parameters. Next, in step 810, a display device handle is created by the display device object, which display device handle allows the display device object to be more easily more manipulated by the system as discussed in detail in the previously-mentioned co-pending patent application entitled "Object Oriented Video Framework System".

In step 812, display device handles are sent to the window server (this step is indicated schematically by arrow 520 in FIG. 5). The display device handles are used to create the internal window objects and format the grafdevices and screen devices that are sent back to the view system. Since the display device handles correspond to the display device objects they select the proper subclasses to create the grafdevice and screen device objects which incorporate the specific hardware characteristics obtained from the video hardware cards. The routine then finishes in step 814.

Figure 10:
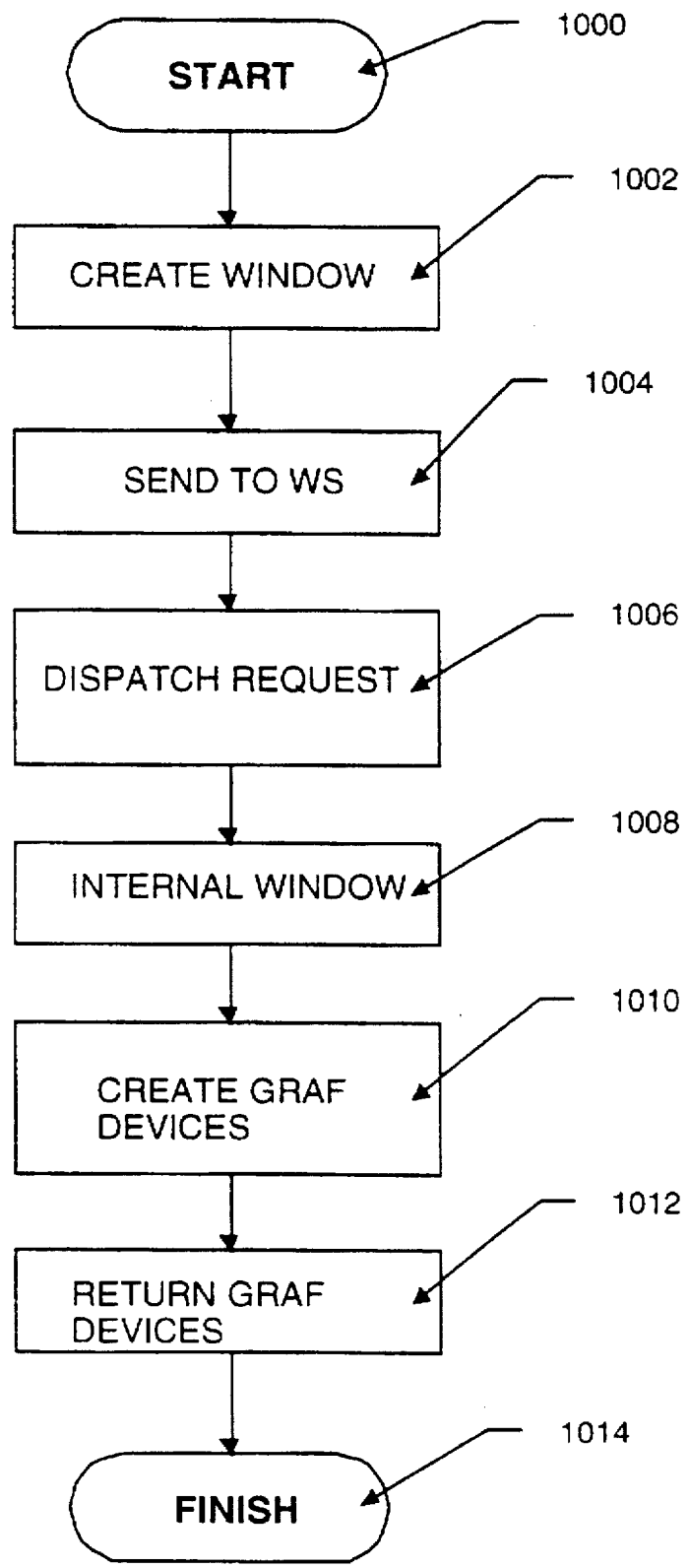
FIG. 10 is an illustrative flow chart of a method by which an application program obtains specialized screen buffer objects incorporating the functionality required to draw on a specialized graphical display device.

FIG. 10 illustrates a method by which hardware-dependent grafdevices and screen devices are incorporated into the view system. In particular, the routine starts in step 1000 and proceeds to step 1002. As previously mentioned, in order to create a given window on the display system, the view system instantiates a system window.

Next, in step 1004, the window descriptions corresponding to the newly created system window object are sent to the window server along with a request to register or create a new window, a process which is illustrated schematically by arrow 508 in FIG. 5.

Next, in step 1006, within the window server, the window create request corresponding to the incoming window descriptions is dispatched to the correct display driver object. This dispatching is done by determining the display device on which the window will appear.

The window server then, in step 1008, requests that the display device object create an internal window. A single internal window object is created unless the desired window spans several different monitors. In this latter case, an internal window cluster is created which is basically an internal window that has other internal windows included. A window cluster allows separate windows to be created on each respective display device.

In step 1010, the display device objects create grafdevices and screen devices which are returned to the view system in step 1012 (illustrated by arrow 510 and FIG. 5). Since the internal windows are created from hardware specific subclasses, the window manipulations will be performed in the correct manner utilizing any hardware that is available. Further, since the grafdevice and screen device objects are created from the internal window objects, they will also be appropriate to the available hardware. Thus, drawing in a screen frame buffer created from these objects will also be appropriate to the existing hardware. The routine finishes in step 1014.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A computer system for controlling a display device having predefined hardware characteristics, the display device for displaying a plurality of window areas on a desktop background, each of the plurality of window areas having displayed therein screen information generated by one of a plurality of application programs, the computer system comprising:

a processor for executing each of the plurality of application programs;

an operating system cooperating with the processor for controlling the display device;

a hardware configuration system coupled to the display device, the hardware configuration system operating during computer system initialization for identifying the predefined characteristics of the display device; and a hardware access system cooperating with the hardware configuration system, the hardware access system for instantiating a display device driver object having a plurality of commands and attributes specific to the predefined characteristics of the display device.

2. A computer system according to claim 1 wherein the hardware access system comprises a plurality of object classes, each of the object classes having a plurality of predefined command sets and defining a plurality of predefined data structures, each of the plurality of command sets and data structures representative of the characteristics of at least one of a plurality of different display devices, wherein the hardware access system selects, during computer system initialization and based on the predefined characteristics of the display device, predetermined ones of the predefined command sets and data structures in order to instantiate the display device driver object.

3. A computer system according to claim 1 wherein the operating system comprises apparatus, responsive to commands generated by the one application program, the apparatus for creating a system window object which creates a specific window area on the display device and which comprises commands for drawing in a screen buffer corresponding to the specific window area.

4. A computer system according to claim 3 wherein the operating system further comprises a window server apparatus responsive to the system window object and to the device driver object, the window server apparatus for creating a screen device object which incorporates the commands and attributes of the display device driver object wherein the screen device object specifically controls for the display device in the specific window area.

5. A computer system according to claim 4 wherein the operating system further comprises apparatus responsive to the screen device object for creating a screen buffer object comprising a screen buffer with specific commands and device characteristics for controlling the display device in the specific window area.

6. A computer system according to claim 3 wherein the computer system comprises a memory and wherein the one application program has exclusive access to an exclusive portion of the memory and wherein the system window object is created in the exclusive memory portion.

7. A computer system according to claim 6 wherein the memory further has a common portion which is accessible by each of the plurality of application programs and the display device driver object is created in the common portion of the memory.

8. A computer system according to claim 7 wherein the screen buffer object is created in the exclusive memory portion.

9. A computer system according to claim 1 wherein the hardware configuration system comprises a device memory, located in the display device, for storing the predefined characteristics of the display device.

10. A computer system according to claim 9 wherein the hardware access system comprises means for reading the predefined characteristics from the device memory.

11. A computer system for controlling a display device having predefined characteristics and for displaying on the display device, a plurality of window areas on a desktop background each of the plurality of window areas having displayed therein screen information generated by one of a plurality of application programs, the computer system comprising:

a processor for executing the one application program such that the one application program generates screen information to be displayed on the display device;

an operating system cooperating with the processor for controlling the display device;

a device memory located in the display device, the device memory having predefined characteristics of the display device stored therein;

a hardware access system having apparatus for reading the device memory during initialization of the computer system and having a plurality of predefined display device driver object classes incorporating commands and defining a plurality of data structures for controlling the operation of a plurality of different display devices, the hardware access system being responsive to predefined characteristics read from the device memory for instantiating a display device driver object from one of the plurality of predefined display device driver object classes, the display device driver object including commands and data structures specific to the predefined characteristics;

apparatus, responsive to commands generated by one of the plurality of application programs, the apparatus for creating a system window object which generates a specific window area on the display device wherein the system window object comprises commands for drawing in a screen buffer; and a window server system, responsive to the system window object and to the device driver object, for creating a screen buffer.

12. A computer system according to claim 11 wherein:

the device memory contains a display device identification code; and the hardware access system comprises predefined commands and defines a plurality of data structures representative a plurality of different display devices and in response to a display device identification code read from the device memory, the hardware access system selects a set of the predefined commands and data structures in order to create the display device driver object.

13. A computer system according to claim 11 wherein the computer system comprises a memory and wherein the one application program has exclusive access to an exclusive portion of the memory and wherein the system window object is created in the exclusive portion of the memory.

14. A computer system according to claim 13 wherein the memory further has a common portion which is accessible by each of the plurality of application programs and the display device driver object is created in the common portion of the memory.

15. A computer system according to claim 14 wherein the screen buffer is created in the exclusive portion of the memory.

16. A computer system for controlling a display device having predefined characteristics, the computer system for generating on the display device a plurality of window areas displayed on a desktop background, each of the plurality of window areas displaying screen information generated by one of a plurality of application programs, the computer system comprising:

a processor for executing each of the plurality of application programs to display screen information on the display device;

a memory, coupled to the processor, the memory having a common memory portion and a plurality of exclusive memory portions, one of the plurality of exclusive memory portions being accessible by the one application program;

an operating system cooperating with the processor for controlling the display device;

a device memory located in the display device, the device memory having stored therein predefined characteristics of the display device;

a hardware access system having predefined display device driver classes, each of the display device driver classes including commands and defining data attributes for controlling the operation of a plurality of different display devices, the hardware access system operable during computer system initialization for instantiating a display device driver object in the common memory portion from one of the predefined display device driver classes based on the predefined characteristics of the display device being read from the device memory; and apparatus responsive to parameters generated by one of the plurality of application programs, the apparatus for creating a system window object in the one exclusive memory portion, which system window object creates a specific window area on the display device and which system window object comprises commands for drawing in a screen buffer corresponding to the specific window area.

17. A computer system according to claim 16 wherein the computer system further comprises:

apparatus for creating a window server object in the common memory portion of the memory; and a first data stream object for transferring the parameters from the system window object to the window server object.

18. A computer system according to claim 17 wherein the window server object comprises apparatus responsive to the parameters transferred from the system window object for creating an internal window object wherein the internal window object is responsive to the window parameters and to the display device driver for creating the screen buffer.

19. A computer system according to claim 18 wherein the computer system further comprises a second data stream object for transferring the screen buffer from the window server object to the system window object.

20. A method for controlling a display device in a computer system, the display device having predefined characteristics, the computer system for generating on the display device a plurality of window areas displayed on a desktop background, each of the plurality of window areas having displayed therein screen information generated by one of a plurality of application programs, the method comprising the steps of:

A. examining the display device during computer system initialization to identify the predefined characteristics of the display device; and B. using the predefined characteristics identified in the examining step to create a display device driver object having specific commands and data attributes for controlling the display device.

21. A method according to claim 20 wherein:

step A comprises the step of:

A1. reading a display device identification code from the display device; and step B comprises the steps of:

B1. compiling a set of predefined commands and defining a data structure for each of a plurality of different display devices;

B2. selecting a set of the predefined commands and a data structure based on the display device identification code read from the display device; and B3. creating the device driver object using the set of predefined command and the data structure selected in step B2.

22. A method according to claim 21 further comprising the steps of:

C. receiving parameters generated by one of the plurality of application programs; and D. creating a system window object using the parameters received in step c wherein the system window object creates a specific window area on the display device and which comprises commands for drawing in a screen buffer corresponding to the specific window area.

23. A method according to claim 22 further comprising the step of creating a screen device object which incorporates the specific commands and data attributes for controlling the display device in the specific window area using the system window object and the device driver object.

24. A method according to claim 23 further comprising the step of creating a screen buffer object comprising a screen buffer with specific commands and data attributes corresponding to device characteristics for controlling the display device in the specific window area using the screen device object.

25. A method according to claim 24 wherein the computer system comprises a memory and wherein the one application program has exclusive access to an exclusive portion of the memory and including the step of creating the system window object in the exclusive memory portion.

26. A method according to claim 25 wherein the memory further has a common portion which is accessible by each of the plurality of application programs and step of creating the device driver object further comprises the step of creating the device driver object in the common portion of the memory.

27. A method according to claim 26 wherein the step of creating the screen buffer object includes the step of creating the screen buffer object in the exclusive portion of the memory.

28. A method according to claim 20 including the step of reading the predefined characteristics from a device memory located in the display device.

29. A method for controlling a display device in a computer system, the display device having predefined characteristics for displaying a plurality of window areas on a desktop background, each of the plurality of window areas having displayed therein screen information generated by one of a plurality of application programs, the computer system having a memory with a common memory portion and a plurality of exclusive memory portions, one of the plurality of exclusive memory portions being accessible by the one application program, the method comprising the steps of:

A. storing the predefined characteristics of the display device in a device memory located in the display device;

B. storing, in the common memory portion, a set of predefined display device driver classes incorporating commands and defining data structures for controlling the operation of a plurality of different display devices;

C. reading the predefined characteristics of the display device from the device memory during computer system initialization;

D. creating, from one of the predefined display device driver classes, a display device driver object in the common memory portion using the predefined characteristics of the display device read from the device memory;

E. receiving window parameters from one of the plurality of application programs; and F. creating a system window object in the one exclusive memory portion, which system window object creates a specific window area on the display device and which system window object comprises commands for drawing in a screen buffer corresponding to the specific window area.

30. In a computer system which includes a display system having a display device and a plurality of different video display hardware circuits, each of the plurality of video display hardware circuits including a configuration memory and operating in accordance with a specific protocol and in response to a particular set of commands, apparatus to create a specialized video device driver object, the apparatus comprising:

a display device IO access manager for identifying each of the plurality of video display hardware circuits physically installed on the computer system and for identifying hardware capabilities of each of the plurality of video display hardware circuits physically installed on the computer system;

means for providing a specialized video device driver class; and means for dynamically constructing a specialized video device driver object from the specialized video device driver class by obtaining video display hardware circuit parameters from the configuration memory of the video display hardware circuit, wherein the video display hardware circuit parameters are used to construct the specialized video device driver object with predetermined hardware capabilities.

31. The apparatus of claim 30 further comprising a hardware configuration system for communicating with the video display hardware circuits, the hardware configuration system comprising:

first configuration programs means for querying a memory for display driver information; and second configuration programs means for modifying display driver information to allow a user to change video display hardware circuit parameters.

32. The apparatus of claim 31 wherein the means for dynamically constructing comprises a hardware access system for communicating with the video display hardware circuits and for obtaining specific hardware device characteristics and parameters by querying the configuration memory of each of the plurality of video display hardware circuits.

33. A computer system for executing an application program, the computer system having a display system coupled thereto, the display system including a display device and a plurality of different video display hardware circuits, each of the video display hardware circuits including a configuration memory and operating in accordance with a specific protocol and in response to a particular set of commands, the computer system comprising:
  (a) a view system for managing a plurality of window areas associated with the application program, the view system comprising:
    (a1) means for interfacing with the application program;
    (a2) means for creating window areas associated with the application program, each of the window areas having a particular boundary; and
    (a3) means for maintaining a plurality of screen buffer objects controlled by the application program, each of the plurality of screen buffer objects for displaying data on the display device;
  (b) a graphic system for facilitating the display of graphical images on the display device, the graphic system in communication with said view system and comprising means for interfacing with the application program;
  (c) a hardware configuration system for communicating with the video display hardware circuits, the hardware configuration system comprising:
    (c1) first configuration program means for querying display driver information; and
    (c2) second configuration program means for modifying display driver information to allow a user to change hardware specific information;
  (d) a hardware access system for communicating with the video display hardware circuits and for obtaining specific hardware device characteristics and parameters by querying the configuration memory of each of the plurality of video display hardware circuits;
  (e) a window server, in communication with said view system, the window server for determining the visible area of each of the plurality of window areas managed by the view system and for communicating the visible area of each window to the application program executing on the computer system; and
  (f) means for passing information obtained from the configuration memories of the plurality of video display hardware circuits by the hardware access system to the window server.

34. The system of claim 33 wherein the view system further comprises:
  (a4) means for destroying window areas associated with the application program; and
  (a5) means for repainting window areas associated with the application program.

35. The system of claim 33 wherein the window server comprises:
  (e1) means for determining a visible area of each window based on the ordering of the plurality of windows, and for determining the extent to which a first window of the plurality of windows overlaps a second window of the plurality of windows;
  (e2) means for maintaining an ordering of window layers;
  (e3) means for ensuring that all windows are presented on the display in an appropriate order;
  (e4) means for maintaining an update area for each window wherein the update area for each window describes a part of the window that has been damaged due to window manipulations;
  (e5) means for notifying the view system when one of the plurality of window update areas becomes non-empty; and
  (e6) means for communicating with the hardware access configuration system and the hardware access system to maintain information about the actual display device on which a screen background is provided.

36. The system of claim 33 wherein the means for passing comprises:
  a device driver object; and
  a display device object, wherein the device driver object and the display device object are created for a particular type of hardware and are used to create the screen buffer objects that are used by the view system to draw on the display devices and wherein commands and methods which are specific to specialized hardware are passed to the screen buffer objects and are then available in the view system for use by the application program.

37. The system of claim 36 wherein the hardware specific information corresponds to hardware specific attributes of the displays wherein at least one of the hardware specific attributes of the displays is provided as:
  a bit depth attribute;
  a monitoring attribute; and
  a positioning attribute.

38. The system of claim 36 wherein the means for creating windows is provided as a system window object instantiated from a pre-defined window class, wherein the system window object creates a corresponding window.

39. A method of creating a window area on a display device, the method comprising the steps of:
  (a) querying a configuration memory of a video display hardware circuit to obtain specific hardware device characteristics and parameters of the video display hardware circuit;
  (b) passing information obtained from the configuration memory of the video display hardware circuit to a window server;
  (c) passing window parameters from an application program to a view system;
  (d) creating a system window object via the view system using the window parameters passed thereto from the application program;
  (e) storing the system window object in an allocated storage area of the view system;
  (f) sending the window parameters used in creating each window object from the view system to the window server;
  (g) sending the specific hardware device characteristics and parameters of the video display hardware circuit to a view system;
  (h) in response to the incoming window parameters, creating the window area on the display device via the window server;
  (i) returning the visible area of the window area to the view system by means of a data stream;
  (j) communicating the visible area of each window to the application program; and
  (k) in response to the specific hardware device characteristics and parameters, drawing in the window area on the display device.

40. The method of claim 39 wherein the passing step further comprises the steps of:

passing the size of the window;

passing the extent of the window;

passing the front-to-back location of the window in relation to at least one other window;

passing a task associated with the window that receives events;

passing a parameter which indicates whether the window should be initially visible; and passing a parameter which indicates the kind of window.

41. The method of claim 39 wherein the step of creating a system window object further comprises the step of creating a plurality of system window objects via the view system, each of the system window objects generating a window.

42. The method of claim 41 wherein the step of creating a system window object includes the step of internally representing, in window server, each window screen area as an internal window object and the method further comprises the step of:

creating the internal window object using the window parameters sent from the view system to the window server.

43. The method of claim 42 further comprising the step of storing the internal window object in a storage area of the window server.

44. The method of claim 43 wherein in response to requests from the view system, the method further comprises the step of performing manipulations of the windows via the internal window object.

45. The method of claim 44 further comprising the step of creating internal window objects from pre-defined classes corresponding to generic display systems.

46. The method of claim 44 further comprising the step of implementing windows which are to incorporate specialized hardware capabilities of display devices by creating subclasses of the classes used to create the internal window objects.

47. The method of claim 46 further comprising the steps of:

identifying actual hardware devices of the computer system; and selecting subclasses which correspond with the actual hardware devices identified in the identifying step.

48. The method of claim 47 further comprising the steps of:

providing, in the window server, a display device object for each display device displaying a window on the screen background, wherein each display device object includes information describing specialized hardware capabilities of the underlying hardware;

creating, via the display device object, the internal window objects for windows which appear on the corresponding display device; and transferring the specialized hardware capabilities from the display device object to the internal window object at the time the internal window object is created.

49. The method of claim 48 further comprising the step of creating, for each video display device, a device driver object, wherein each device driver object is created by a display device IO access manager which is provided as part of the hardware access system and wherein each device driver object is specific to the type of hardware to which the display device IO access manager is assigned.

50. The method of claim 49 wherein the step of creating the device driver object, includes the step of the display device IO access manager directly interacting with a particular piece of hardware.

51. The method of claim 50 wherein the step of creating internal window objects, includes the steps of:

creating graph device objects; and creating screen device objects, wherein the graph device objects and the screen device objects are used by the view system and the application program to draw graphics on the display device and to perform non-window operations.

52. The method of claim 51 wherein the non-window operations correspond to sprite control operations and cursor control operations.

53. The method of claim 52 further comprising the step of streaming the graph device object and screen device object to the view system.

* * * * *